(12) United States Patent
Sautter et al.

(10) Patent No.: US 6,230,976 B1
(45) Date of Patent: May 15, 2001

(54) PINLESS DITHERING ASSEMBLY FOR DATA READING

(75) Inventors: Christopher F. Sautter, Eugene; James J. Jensen, Coburg; David N. Ruff, Sherwood; Charles A. Orlick, Eugene, all of OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/174,677

(22) Filed: Oct. 19, 1998

(51) Int. Cl.⁷ ....................................... G02B 5/08
(52) U.S. Cl. ................. 235/462.36; 235/472.01; 235/462.4; 235/462.43
(58) Field of Search .................... 235/469, 492, 235/462.36, 462.4, 462.43, 462.45

(56) References Cited

U.S. PATENT DOCUMENTS

| | | | |
|---|---|---|---|
| 4,175,832 | * 11/1979 | Umeki et al. | 350/285 |
| 4,660,941 | * 4/1987 | Hattori et al. | 350/487 |
| 4,691,212 | * 9/1987 | Solcz et al. | 346/108 |
| 4,708,420 | * 11/1987 | Liddiard | 350/6.6 |
| 5,170,277 | * 12/1992 | Bard et al. | 359/210 |
| 5,293,265 | * 3/1994 | Aleshin et al. | 359/198 |
| 5,475,206 | * 12/1995 | Reddersen et al. | 235/462.01 |
| 5,600,120 | * 2/1997 | Peng | 235/467 |
| 5,663,550 | * 9/1997 | Peng | 235/467 |
| 5,668,655 | * 9/1997 | Schwiezer et al. | 359/198 |
| 5,693,929 | 12/1997 | Dvorkis et al. | 235/454 |

* cited by examiner

Primary Examiner—Thien M. Le
Assistant Examiner—Daniel S Felten
(74) Attorney, Agent, or Firm—Lyon & Lyon LLP

(57) ABSTRACT

A scanning system and method of data reading in which the scanning system is provided with a dithering assembly that is compact, easy to assemble, and configured to protect the more delicate scanning components, such as flexures, from damage due to external mechanical shock. In a preferred construction, the dithering assembly includes a dither mount and a mirror mount, each mount having an arm adapted to matingly engage one another. In particular, the dither mount arm may include a socket configured to receive a ball member protruding from the mirror mount arm.

26 Claims, 5 Drawing Sheets

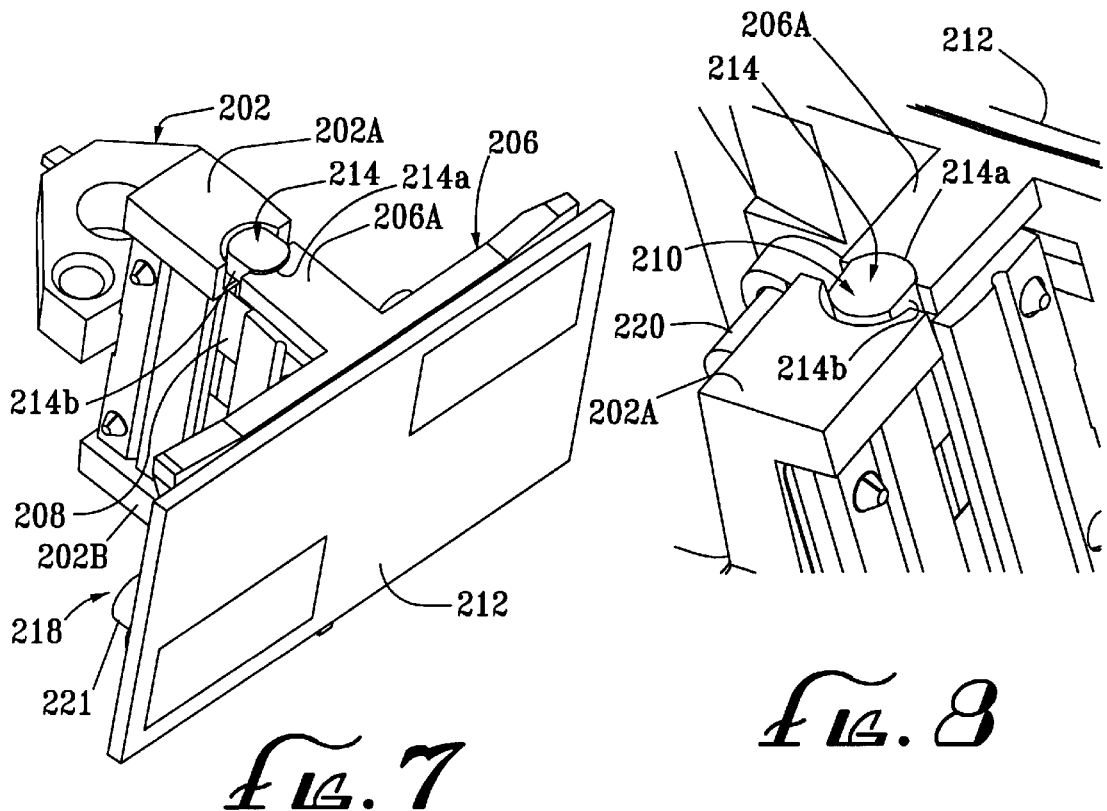
FIG. 7
FIG. 8
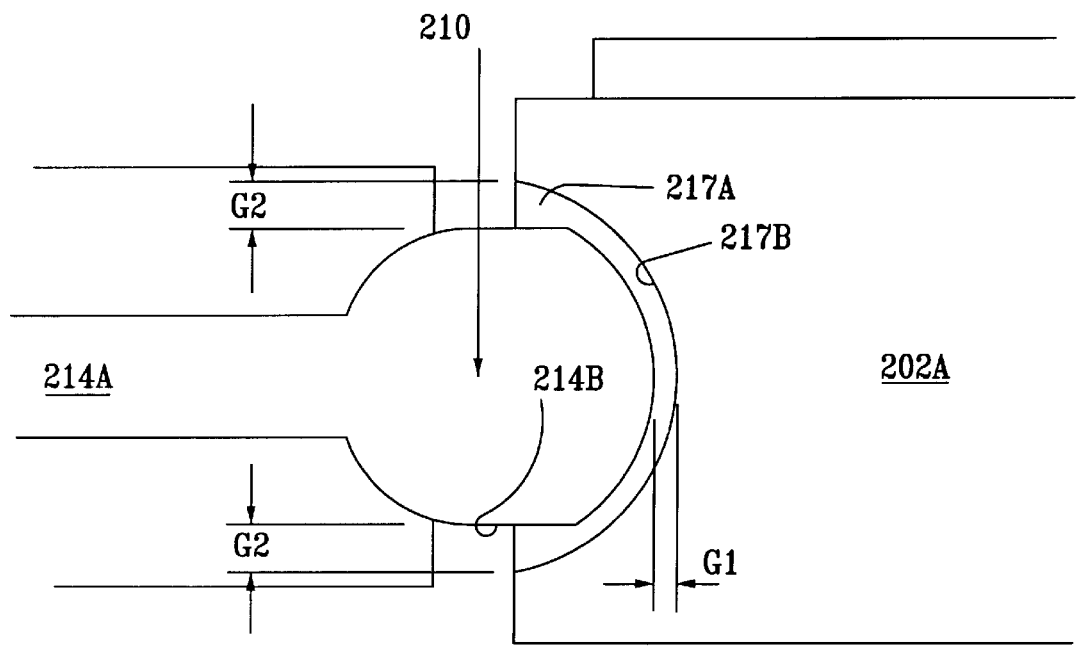
FIG. 6

PINLESS DITHERING ASSEMBLY FOR DATA READING

BACKGROUND

The field of the present invention relates to optical systems for data reading and particularly to a scanning system having improved resistance to shock and vibration.

Typically, a data reading device such as a bar code scanner illuminates a bar code and senses light reflected from the code to detect the bars and spaces of the code symbols and thereby derive the encoded data. In a common system, the scanner includes a housing and a scan module comprising a light source, one or more scanning mechanisms, a detector, and optics and signal processing circuitry.

A variety of scan modules and their scanning mechanisms are known as described in, for example, U.S. Pat. Nos. 5,475,206 and 5,629,510 or U.S. application Ser. No. 08/934,487, each of these disclosures hereby incorporated by reference. Such scanning mechanisms typically comprise rotating polygon mirror assemblies and dithering or oscillating mirror assemblies. Dithering assemblies typically comprise a cantilevered mirror and a drive means or dithering motor for moving the mirror.

FIG. 1 illustrates a dithering assembly 100 comprising a mirror/magnet assembly 110, drive coil 106, feedback coil 108, bending member or flexure 112, and mounting member 114. The mounting member 114 is mounted to a suitable chassis (not shown). The mirror/magnet assembly comprises mirror 102, mirror bracket 103, drive magnet 104, and feedback magnet 105. The bracket 103 holds mirror 102 and is pivotally supported on the mounting member 114 via flexure 112. Bending of flexure 112 results in rotation of the mirror/magnet assembly 110 about an axis substantially parallel to mirror 102, perpendicular to the plane of FIG. 1.

Due to the cantilevered ditherer configuration and the sensitive components used to construct the scanner, current scanners are relatively sensitive to shock and are often damaged before they would have worn out for other reasons. Handheld scanners are particularly subjected to shock and have been equipped with shock protection such as by mounting the scan module to the interior of the housing body via shock mounts as described in U.S. Pat. No. 5,475,206.

Other shock protection includes a pin-in-hole arrangement that typically comprises a moving pin associated with the cantilevered mirror, and a stationary hole associated with the support structure (e.g., the chassis). Since during dithering (rotating) operation, there is no lateral motion of the pin within the hole, the required clearance inside the stationary hole need only be sufficient to accommodate process and temperature variations.

While the pin-in-hole arrangement may protect the flexure from yielding during overflexure or buckling, its assembly is often difficult. Assembly can be made easier by increasing the diameter of the hole. However, a larger hole diameter affords less protection against higher shock levels when compared to the level of protection afforded by a smaller hole diameter. Furthermore, once the pin is properly positioned inside the hole, should the level of shock protection need to be changed, the hole diameter itself must be changed.

In an attempt to overcome some of the problems inherent with the pin-in-hole arrangement, dithering assemblies have been equipped with shock mounts. Mounting the flexure to the mounting member via shock mounts, as described in, for example, U.S. Application entitled "FLEXIBLE DITHER MOUNT WITH ROTATION," Svetal et al., filed Sep. 3, 1998 with Express Mail Label No. EM351172541US, hereby incorporated by reference, advantageously permits the diameter of the stationary hole to be larger than the diameter would be without the shock mounts. However, this design may increase manufacturing costs as well as the overall size of the scanning mechanism. Having recognized these conditions, an improved scanning system resistant to shock and vibration is desired.

SUMMARY OF THE INVENTION

To these ends, the present invention is directed to a scan module and scanning mechanism including a dithering assembly that is compact, easy to assemble, and configured to protect the more delicate scanning components, such as flexures, from damage due to external mechanical shock. In a preferred construction, the dithering assembly includes a dither mount and a mirror mount, each mount having an arm adapted to matingly engage one another. In particular, the dither mount arm may include a socket configured to receive a boss of the mirror mount arm.

BRIEF DESCRIPTION OF THE DRAWINGS

FIG. 6 is a detailed top view of the boss and socket configuration of FIG. 4;

FIG. 7 is a perspective view of a dither scanning mechanism according to another preferred embodiment; and FIG. 8 is a detailed perspective view of the dither scanning mechanism of FIG. 7.

DETAILED DESCRIPTION OF PREFERRED EMBODIMENTS

Preferred embodiments will now be described with reference to the drawings. For clarity of description, any element numeral in one figure will represent the same element if used in any other figure.

Figure 1:
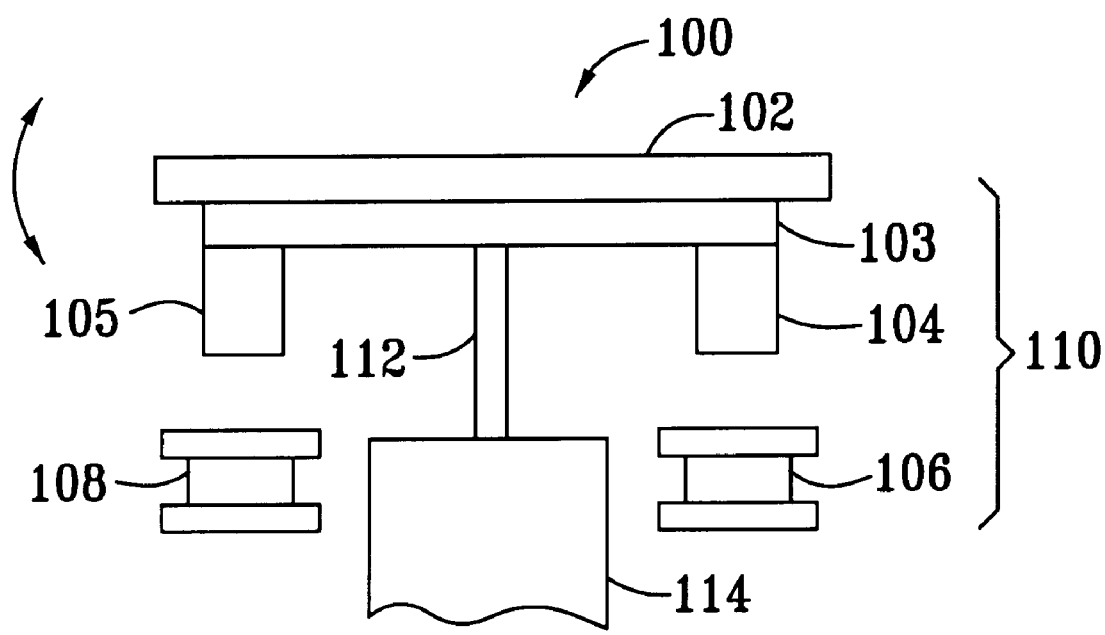
FIG. 1 is a top view of a previous dithering assembly comprising a cantilevered mirror and a dithering motor for moving the mirror.
Figure 2:
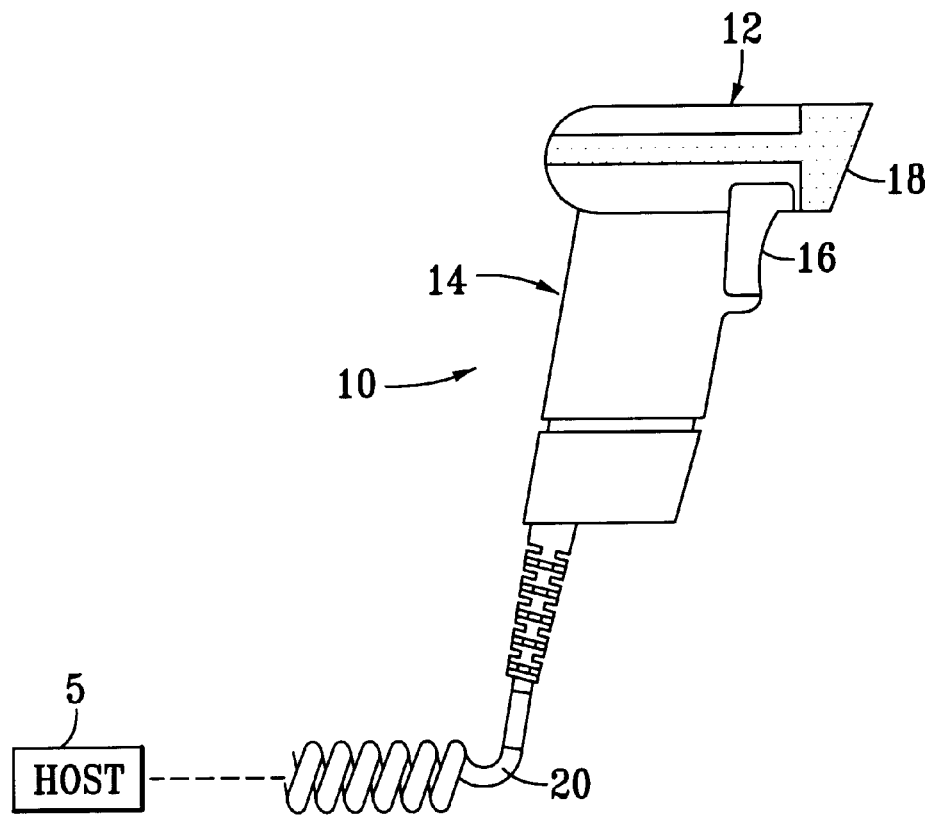
FIG. 2 is a side view of a handheld scanner as may be utilized by a preferred embodiment.
Figure 3:
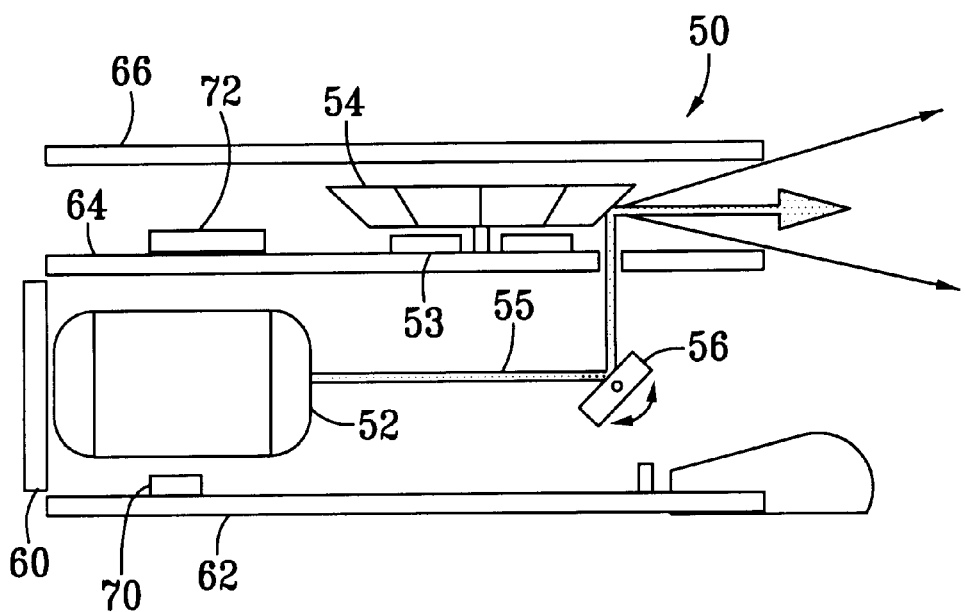
FIG. 3 is a diagrammatic side view of an example scan module.

FIGS. 2–3 illustrate an example of a bar code reader 10 configured as a handheld gun-shaped device constructed of a lightweight plastic housing having a head portion 12 and pistol-grip type handle portion 14. The head portion 12 contains a removable scan module or assembly 50 that contains a light source, a detector, and the optics and signal processing circuitry.

The scan assembly 50 may also include one or more scanning mechanisms, as shown for example in FIG. 2 as a first dithering mirror assembly 56 and a second rotating polygon mirror assembly 54 driven by motor coils 53. The light source of the scan assembly 50 typically includes a laser diode 52 producing a light beam 55 which is scanned by one or more mirror assemblies 54, 56 and then exits the window 18. The components may be mounted to a suitable chassis and contained within an enclosure the sides of which may be part of the chassis or integrated into printed circuit boards 60, 62, 66.

The scanner 10 may be attached to a host 5 via a cable 20, connected or incorporated into a portable data terminal, or may be cordless, powered by an internal battery, communicating with the host via wireless link or storing data in memory for periodic download, such as when integrated in a portable data terminal. A light-transmissive window 18 in the front end of the scan head portion 12 permits outgoing light beam 55 to exit and the incoming reflected light to enter. The user aims the reader 10 at a bar code symbol and actuates a trigger 16 on the handle portion 14 to activate the light source and scanning mechanism to scan the beam 55 across the bar code symbols.

Figure 4:
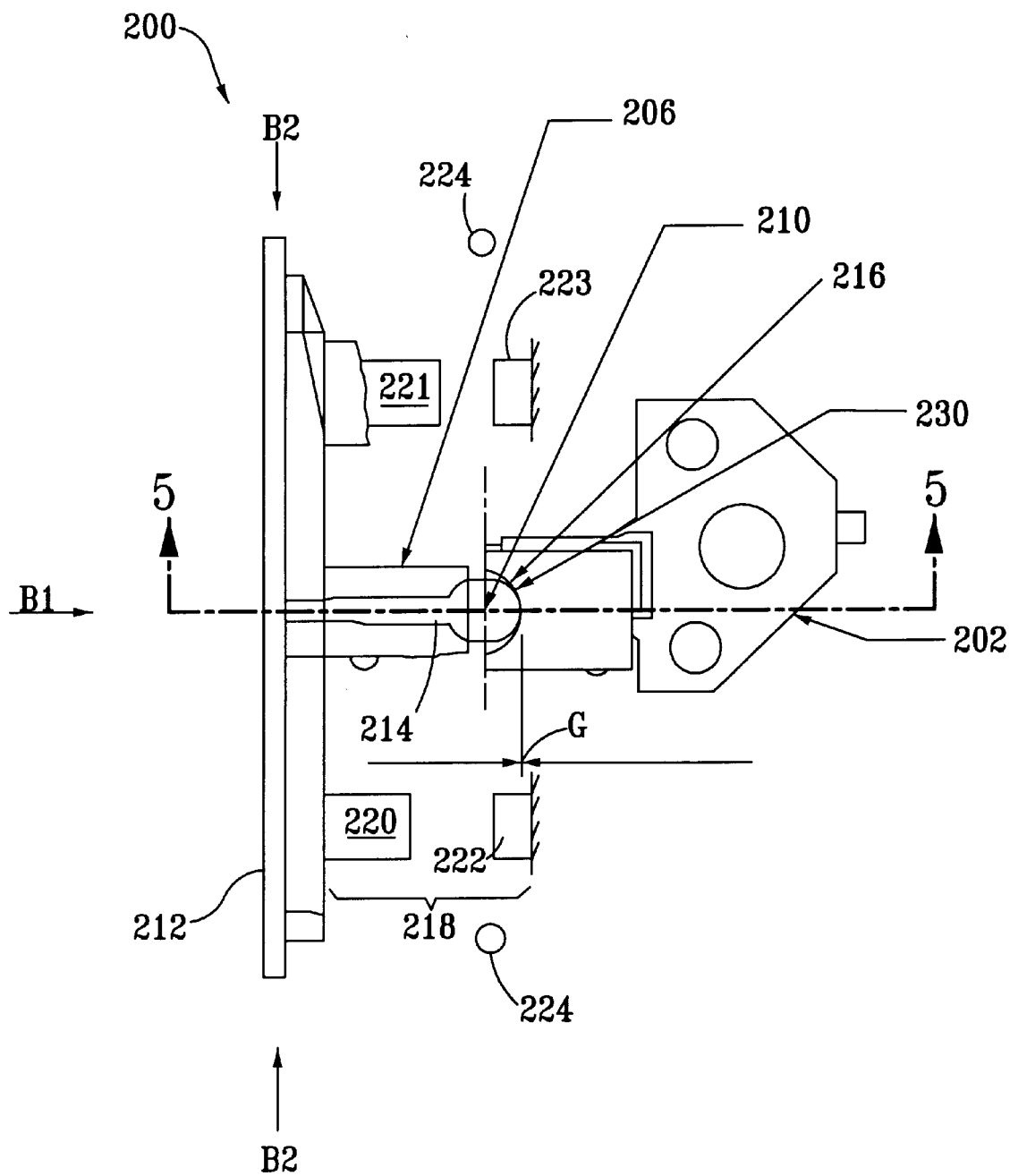
FIG. 4 is a top view of a dither scanning mechanism according to a preferred embodiment.
Figure 5:
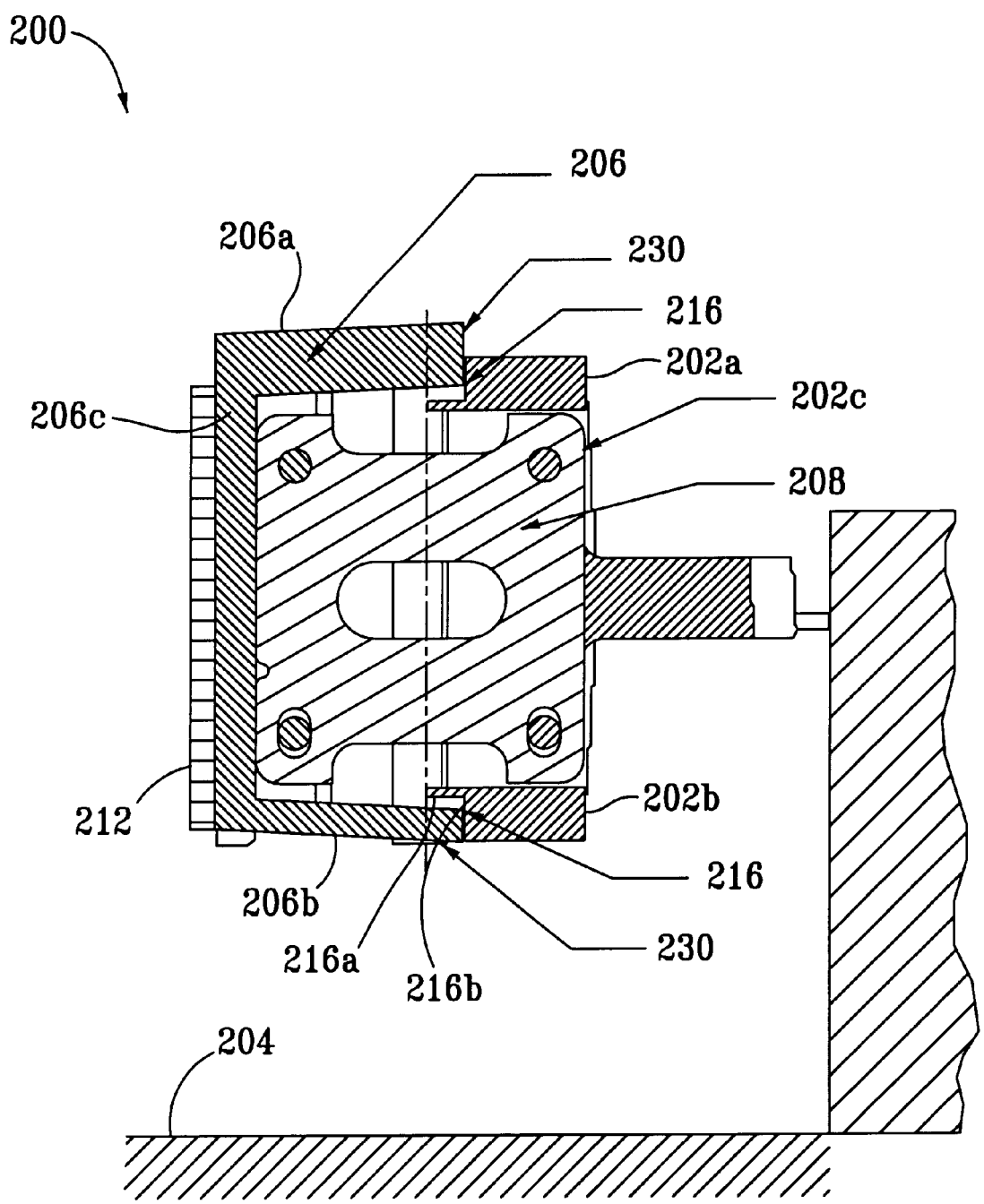
FIG. 5 is a cross-sectional view of the dither scanning mechanism taken along line 5—5 of FIG. 4.

FIGS. 4–6 illustrate a dithering mirror assembly 200 according to a first preferred embodiment. The dithering assembly 200 includes a mounting member or dither mount 202 mounted to a suitable chassis or housing member 204. A bending member or flexure 208 has a support or fixed end attached to the dither mount 202 and a free or movable end attached to a mirror bracket or mirror mount 206. A mirror 212 is mounted to the mirror mount 206 and supported by the flexure 208 in a cantilevered fashion so as to pivot about a center of rotation or pivot point 210.

The mirror 212 is oscillated or dithered about pivot point 210 via dithering motor 218. While the dithering motor 218 may comprise an array of different components and configurations such as for example those described in U.S. application Ser. No. 60/026,536, incorporated herein by reference, FIGS. 4–6 illustrate a dithering motor 218 that includes permanent magnets 220, 221 disposed on opposite sides of the mirror 212. Electromagnetic drive coils 222, 223 as controlled by a suitable controller drive the permanent magnets. When engaged, the dithering motor 218 bends flexure 208, resulting in rotation of the mirror 212 about an axis substantially parallel to the mirror 212, perpendicular to the plane of FIG. 4.

Turning in detail to FIGS. 4–6, the mirror mount 206 is substantially U-shaped in cross-section as defined by a pair of opposing arms 206a, 206b joined together at one end via a straight section 206c. The mirror 212 is mounted to the straight section 206c on the exterior of the mirror mount 206 opposite arms 206a, 206b.

Each arm 206a, 206b may include a boss. FIGS. 4–6 illustrate two preferred embodiments of bosses 214, 215 respectively associated with arms 206a, 206b. Referring to arm 206a, boss 214 may include an optional raised section 214a and a protruding section or ball member 214b. If used, the raised section 214a, orthogonally extending away from arm 206a, provides additional rigidity and/or structural integrity to arm 206a. Such additional structural support may be advantageous in countering gravitational forces. Ball member 214b extends away from and parallel to arm 206a. Raised section 214a originates from the juncture of arm 206a and straight section 206c, and runs along the entire length of arm 206a and ball member 214b. As seen from the top in FIG. 4, the raised section 214a is substantially rectangular until a point near the end opposite the straight section 206c. Here, the raised section 214a is substantially elliptical in order to correspond to the dimensions of ball member 214b. When viewed from the top as shown in FIG. 4, the boss 214, in its entirety, has a shape reminiscent of a thermometer.

Referring to arm 206b, while boss 215 may include a raised section, FIG. 5 illustrates boss 215 as including only a protruding section or ball member 215b. The ball member 215b extends away from and parallel to arm 206b, in the same manner ball member 214b extends away from and parallel to arm 206a. Ball member 215b also has a substantially elliptical shape, in the same manner as ball member 214b.

Similar to the mirror mount 206, the dither mount 202 includes a pair of opposing arms 202a, 202b. As illustrated in FIG. 5, a bracket section 202c joins together one end of each of the mount arms 202a, 202b. Opposite the bracket section 202c, each mount arm 202a, 202b includes a trough or socket. Mount arm 202a includes socket 217, whereas mount arm 202b includes socket 216. Arcuate sidewalls 217b and, optionally, floor 217a define socket member 217. While floor 217a provides no additional structural advantages, tooling of socket 217 is made easier if floor 217a is used to help define socket 217. Sidewalls 217b are dimensioned to matingly engage ball member 214b.

In the same manner as socket 217, arcuate sidewalls 216b and, optionally, floor 216a may define socket 216. While floor 216a provides no additional structural advantages, tooling of socket 216 is made easier if floor 216a is used to help define socket 216. Sidewalls 216b are dimensioned to matingly engage ball member 215b of boss 215.

When viewed in cross-section as shown in FIG. 5, each trough 216, 217 is substantially L-shaped. Each ball member 214b, 215b and socket 217, 216, respectively work together to limit the deflection of the flexure 208 from overflexing or buckling when the dithering assembly 200 is subjected to an external shock or vibration. Since the flexure 208 is most likely to yield during buckling, the present invention allows for a small amount of deflection in buckling and a larger amount of deflection in bending. No protection is provided for in tension, as none is needed.

In particular, should the dithering assembly 200 be subjected to a front or buckling load B1, the flexure 208 will buckle and close the buckling gap G1 between the ball members 214b, 215b and sockets 217, 216. When the ball members 214b, 215b and sockets 217, 216 make contact, the flexure 208 is protected from further deformation, and possible yielding. Should the dithering assembly 200 be subjected to a side or bending load B2, the walls 216b, 217b defining the sockets 216, 217 wrap around the ball members 215b, 214b at the center of rotation 210 of the ditherer such that the walls 216b, 217b act as a side stop to limit travel of the ball members 215b, 214b within the sockets 216, 217. In this manner, the flexure 208 is allowed to deflect during bending and close bending gap G2 between ball members 214b, 215b and sidewalls 217b, 216b, without overflexure of flexure 208 to the point of yielding.

Advantageously, such a pinless design only protects the flexure 208 in the directions that need protection, without overconstraining the dithering movement. Moreover, this embodiment minimizes manufacturing tolerances. In particular, as the flexure 208 is mounted between the mirror mount 206 and the dither mount 202, and the bosses 214, 215 and sockets 217, 216 are located on the respective arms 206a, 206b, 202a, 202b thereof, small tolerances are easily achieved. For example, G1 is presently a distance of approximately 0.003". With small tolerances, the buckling gap G1 can be reduced which improves shock protection. In addition, small tolerances keep the overall size of the dithering assembly 200 small. Further, the present invention obviates the manufacturing step of positioning a pin in a hole, or shock mounting the fixed side of the flexure 208. Accordingly, such a pinless ditherer design also makes assembly easier, less complicated, and less costly.

FIGS. 7–8 illustrate a dithering mirror assembly 200 according to another preferred embodiment. This preferred embodiment is identical in all respects to the preferred embodiment illustrated in FIGS. 4–6, except for the different configuration of the boss 214 of arm 206a. In particular, as shown in FIGS. 7–8, this boss 214 may optionally include a raised section 214a. However, raised section 214a does not originate from the juncture of arm 206a and straight section 206c as it did in the earlier preferred embodiment illustrated in FIGS. 4–6. Rather, raised section 214a only extends away from arm 206a at a point near the end opposite the straight section 206c and from the top of ball member 214b. The perspective views of FIGS. 7 and 8 illustrate the boss 214 of this embodiment to be substantially elliptical. While raised section 214a of boss 214 of this embodiment should offer more strength/reinforcement to arm 206a than an arm 206a without a raised section 214a, if more rigidity is required, raised section 214a may be extended to run the entire length of arm 206a as shown in FIGS. 4–6. Accordingly, while FIGS. 4–8 illustrate three different embodiments for bosses 214, 215, any combination thereof may be employed.

Additional shock protection may be used with any of the embodiments shown in FIGS. 4–8. For example, the scan assembly module 50 may be positioned within the scan head 12 and mounted to the interior of the scan head 12 by shock mounts as described in U.S. Pat. No. 5,475,206. Moreover, the individual printed circuit board and/or chassis elements 60, 62, 64, 66 may be provided with additional, separate shock mounting features.

For enhanced shock protection, the dithering assembly 200 may also include dither parking mechanisms as disclosed in U.S. Ser. No. 09/119,253, hereby incorporated by reference. In addition, the dithering assembly may include one or more travel stops 224, as described in U.S. application Ser. No. 60/026,536 and incorporated herein by reference, for restricting the amplitude of the dithering motion to a maximum dithering amplitude and for assisting in the reversal of motion of the dithering assembly. For even greater shock protection, the dither mount arms 202a, 202b may be flexible, and the dither mount 202 itself may be mounted on a rotatable bracket, as described in U.S. application entitled "FLEXIBLE DITHER MOUNT WITH ROTATION," Svetal et al., filed Sep. 3, 1998 with Express Mail Label No. EM351172541US.

The flexure 208 may be constructed from metal such as beryllium copper alloy, aluminum, steel, titanium, or plastic such as Mylar™, or combinations thereof. The dither mount 202 and the mirror mount 206 and their respective arms 202a, 202b, 206a, 206b may also be constructed from metal, plastic, rubber or other flexible material. Each of the mounts 202, 206 may be constructed in a single molded component or as a combination of parts.

Though the following examples are illustrated as applied to dithering mirror assemblies, the present invention may be applied to improving shock protection on other devices. For example, the present invention may be applied to a pivoting/oscillating light source or laser diode, a dithering/oscillating prism, a holographic element, etc.—essentially any device comprising a supporting structure which allows for movement of a mechanical scanning mechanism.

Thus while embodiments and applications of the present invention have been shown and described, it would be apparent to one skilled in the art that other modifications are possible without departing from the inventive concepts herein. The invention, therefore, is not to be restricted except in the spirit of the claims that follow.

What is claimed is:

1. A scanning module having a dithering assembly for data reading, comprising:

a base;

a dither mount attached to the base;

a flexure having a support end attached to the dither mount and a free end;

a mirror mount attached to the free end of the flexure;

a dithering scanning component supported by the mirror mount for scanning a light beam across an object to be read;

wherein the mirror mount and the dither mount each include an arm, wherein each arm does not engage one another during normal operation and wherein each arm is adapted to matingly engage one another for reducing flex experienced by the flexure when the module is subjected to mechanical shock.

2. A scanning module according to claim 1 wherein one of the mirror mount arm and the dither mount arm includes a boss and the other of the mirror mount arm and the dither mount arm includes a socket.

3. A scanning module according to claim 1 wherein the dither mount arm includes a socket for receiving a ball member of the mirror mount arm.

4. A scanning module according to claim 1 wherein the scanning component includes a mirror.

5. A scanning module according to claim 4 wherein the flexure comprises a spring, and wherein the spring lies in a plane generally perpendicular to the mirror in an unflexed condition of the spring.

6. A scanning module according to claim 1 wherein the scanning component comprises a magnetically driven dithering mirror.

7. A scanning system for data reading comprising:

a light source for generating a reading beam;

a base;

a dither mount mounted to the base;

a flexure having a support end attached to the dither mount and a free end;

a mirror mount attached to the free end of the flexure;

a scan mirror mounted to the mirror mount;

wherein the mirror mount includes an arm projecting away from the mirror;

wherein the dither mount includes an arm projecting toward the mirror, wherein each arm does not engage one another during normal operation and wherein each arm is adapted to matingly engage one another for reducing stress experienced by the flexure when the scanning system is subjected to mechanical shock.

8. A scanning system for data reading according to claim 7 wherein the dither mount arm includes a socket.

9. A scanning system for data reading according to claim 8 wherein the mirror mount arm includes a boss having a ball member, the socket configured to receive the ball member.

10. A scanning system for data reading according to claim 9 wherein the boss includes a raised section.

11. A scanning system for data reading according to claim 10 wherein the raised section runs along the length of mirror mount arm.

12. A scanning system for data reading according to claim 11 wherein the raised section runs along the length of the ball member.

13. A scanning system for data reading according to claim 7 comprising a portable handheld scanning unit.

14. A scanning system for data reading comprising:

a light source generating a reading beam;

a base;

a dither mount mounted to the base;

a scan mirror pivotally supported by the dither mount via a flexure acting as a cantilever;

wherein the scan mirror is mounted to a mirror mount having a first arm, a second arm, and a straight section joining the first arm to the second arm;

wherein the dither mount includes a first arm, a second arm, and a bracket section joining the first arm to the second arm, the first dither mount arm adapted to engage the first mirror mount arm for reducing stress experienced by the flexure when the scanning system is subjected to mechanical shock.

15. A scanning system for data reading according to claim 14 wherein the first dither mount arm includes a socket at one end thereof.

16. A scanning system for data reading according to claim 15 wherein the first mirror mount arm includes a ball member at one end thereof, the ball member configured to fit within the socket of the first dither mount arm.

17. A scanning system for data reading according to claim 16 wherein the second dither mount arm is adapted to matingly engage the second mirror mount arm for reducing stress experienced by the flexure when the scanning system is subjected to mechanical shock.

18. A scanning system for data reading according to claim 17 wherein the second dither mount arm includes a socket at one end thereof.

19. A scanning system for data reading according to claim 18 wherein the second mirror mount arm includes a ball member at one end thereof, the ball member configured to fit within the socket of the second dither mount arm.

20. A method of providing mechanical shock protection for a flexure of scan mechanism of a handheld data reader, comprising the steps of attaching one end of the flexure to a dither mount having an arm;

attaching a second end of the flexure to a mirror mount having an arm;

mounting a scan element to the mirror mount;

disposing the dither mount arm next to the mirror mount arms such that each arm does not engage one another during normal operation;

matingly engaging the dither mount arm to the mirror mount arm for reducing stress experienced by the flexure when the scanning system is subjected to mechanical shock.

21. A method according to claim 20 wherein the mirror mount includes an arm having a boss, and the boss includes a ball member.

22. A method according to claim 21 wherein the dither mount includes an arm having a socket, the socket configured to receive the ball member.

23. A scanning system for data reading comprising:

a light source for generating a reading beam;

a base;

a dither mount mounted to the base;

a flexure having a support end attached to the dither mount and a free end;

a mirror mount attached to the free end of the flexure;

a scan mirror mounted to the mirror mount;

wherein the mirror mount includes an arm projecting away from the mirror, the mirror mount arm including a boss having a raised section;

wherein the dither mount includes an arm projecting toward the mirror, each arm adapted to matingly engage one another for reducing stress experienced by the flexure when the scanning system is subjected to mechanical shock.

24. A scanning system for data reading according to claim 2 wherein the boss is disposed within the socket such that a clearance buckling gap exists, wherein the buckling gap closes when the scanning system is subjected to a buckling load.

25. A scanning system for data reading according to claim 2 wherein the boss is disposed within the socket such that a clearance bending gap exists, wherein the bending gap closes when the scanning system is subjected to a bending load.

26. A scanning system for data reading according to claim 24 wherein the buckling gap is about 0.003".

* * * * *